United States Patent
Kieser et al.

(10) Patent No.: US 9,260,004 B2
(45) Date of Patent: Feb. 16, 2016

(54) METHOD AND DEVICE FOR VERIFYING A DRIVE TORQUE APPLIED BY AN ELECTRIC MACHINE IN A HYBRID DRIVE OF A MOTOR VEHICLE

(75) Inventors: Joerg Kieser, Bietigheim-Bissingen (DE); Albert Bardoll, Rutesheim (DE); Danny Mueller, Oberboihingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 443 days.

(21) Appl. No.: 13/514,237

(22) PCT Filed: Nov. 5, 2010

(86) PCT No.: PCT/EP2010/066888
§ 371 (c)(1),
(2), (4) Date: Aug. 14, 2012

(87) PCT Pub. No.: WO2011/076473
PCT Pub. Date: Jun. 30, 2011

(65) Prior Publication Data
US 2012/0303196 A1 Nov. 29, 2012

(30) Foreign Application Priority Data
Dec. 21, 2009 (DE) .......................... 10 2009 055 062

(51) Int. Cl.
*B60W 20/00* (2006.01)
*B60W 10/08* (2006.01)
(Continued)

(52) U.S. Cl.
CPC .................. *B60K 6/48* (2013.01); *B60W 10/06* (2013.01); *B60W 10/08* (2013.01); *B60W 20/00* (2013.01); *B60L 2240/423* (2013.01);
(Continued)

(58) Field of Classification Search
CPC ..... B60W 20/00; B60W 10/08; B60W 10/06; Y02T 10/6286; B60L 2240/423
USPC ................................................ 701/22; 180/65
See application file for complete search history.

(56) References Cited

U.S. PATENT DOCUMENTS

| 5,461,289 | A | * | 10/1995 | Adler et al. | .................... 318/139 |
| 2002/0108373 | A1 | * | 8/2002 | Frey | ................................ 60/698 |

(Continued)

FOREIGN PATENT DOCUMENTS

| CN | 101351351 | 1/2009 |
| DE | 4133059 | 4/1993 |

(Continued)

OTHER PUBLICATIONS

International Search Report, PCT International Application No. PCT/EP2010/066888, dated Jan. 26, 2011.

*Primary Examiner* — Redhwan K Mawari
*Assistant Examiner* — Rodney P King
(74) *Attorney, Agent, or Firm* — Kenyon & Kenyon LLP

(57) ABSTRACT

A method for verifying a drive torque applied by an electric machine in a hybrid drive of a motor vehicle, the motor vehicle being propelled by the electric machine and/or an internal combustion engine, and it being checked if the drive torque applied by the electric machine is determined accurately. In order to ensure that the operating strategy is correctly implemented and a shift in load level in the power train functions reliably during operation of the motor vehicle, the drive torque applied by the electric machine is evaluated with regard to its accuracy, using a drag torque generated by the combustion engine during an overrun fuel cut off.

11 Claims, 2 Drawing Sheets

(51) Int. Cl.
  *B60W 10/06* (2006.01)
  *B60K 6/48* (2007.10)

(52) U.S. Cl.
  CPC ...... *B60W 2710/083* (2013.01); *Y02T 10/6221* (2013.01); *Y02T 10/6286* (2013.01); *Y02T 10/642* (2013.01)

(56) References Cited

U.S. PATENT DOCUMENTS

| | | |
|---|---|---|
| 2003/0229429 A1 | 12/2003 | Zhang et al. |
| 2005/0256618 A1 | 11/2005 | Hsieh et al. |
| 2006/0289210 A1* | 12/2006 | Yoshimi ................. 180/65.2 |
| 2007/0016340 A1* | 1/2007 | Soudier et al. ............. 701/1 |
| 2009/0095063 A1 | 4/2009 | Kanamori |
| 2010/0042276 A1 | 2/2010 | Seel et al. |
| 2011/0093145 A1 | 4/2011 | Doerr et al. |

FOREIGN PATENT DOCUMENTS

| | | |
|---|---|---|
| DE | 102005040780 | 3/2007 |
| DE | 102005062870 | 7/2007 |
| DE | 102008008536 | 8/2009 |
| DE | 102008000869 | 10/2009 |

* cited by examiner

METHOD AND DEVICE FOR VERIFYING A DRIVE TORQUE APPLIED BY AN ELECTRIC MACHINE IN A HYBRID DRIVE OF A MOTOR VEHICLE

FIELD OF THE INVENTION

The present invention relates to a method for verifying a drive torque applied by an electric machine in a hybrid drive of a motor vehicle, the motor vehicle being propelled by the electric machine and/or an internal combustion engine, it being checked if the drive torque applied by the electric machine is determined accurately. The present invention also relates to a device for implementing the method.

BACKGROUND INFORMATION

Vehicles having a hybrid drive structure mostly have an internal combustion engine as a first drive unit and an electric machine or a hydraulic motor as a second drive unit. Further drive units are also possible. Thus, during operation of the hybrid vehicle, the drive torque may be applied jointly by the drive units.

In such a hybrid system, the combustion engine is disconnected from the power train and stopped at specific operating points, through which, in addition to lower exhaust-gas emissions, a lower fuel consumption occurs. The vehicle moves purely electrically, due to the motively-connected, electric machine and the energy for operating the electric machine, which is stored in a high-voltage battery. By switching the electric machine over into a generative mode, power is fed back into the high-voltage battery when the combustion engine is recoupled to the power train, which means that the high-voltage battery is charged. However, charging of the high-voltage battery is also possible when the combustion engine is uncoupled. In order to perform the automatic charging and discharging operations, an operating strategy is stored in the specific control unit.

Starting out from the specific operating strategy, a torque of the electric machine that is applied by the electric machine is calculated as a drive torque by the control unit of the electric machine. This calculated torque must be highly accurate, in order to render possible an optimum manner of operation of the power train made up of the combustion engine and the electric machine, in particular, during hybrid operation of the motor vehicle.

A method, in which a continuous torque comparison takes place within one monitoring level in a vehicle control unit, is described in German Patent Application No. DE 10 2005 062 870 A1. In this context, a permissible torque is ascertained. Using a torque-range check, it is determined if the ascertained setpoint torque is within torque ranges of two separate drive units.

SUMMARY

An example method in accordance with the present invention for verifying a torque applied by an electric machine in a hybrid drive of a motor vehicle may have the advantage that during operation of the motor vehicle, the operating strategy is correctly executed and a shifting of load level in the power train functions reliably. Since the torque applied by the electric machine is evaluated with regard to its accuracy, using a drag torque generated by the combustion engine during an overrun fuel cutoff, errors in the calculation of the torque of the electric machine may be reliably detected. The check of the accuracy of the torque taking the form of, and calculated as, the drive torque may be both controlled via a garage test and initiated by a test routine during operation of the motor vehicle. Additional structural units are not needed for this check.

The electric machine and/or the internal combustion engine are advantageously set to a predetermined overall speed; a separating clutch situated between the electric machine and the combustion engine being closed, and the combustion engine being shifted into the state of overrun fuel cutoff, and the drive torque applied by the electric machine during the overrun fuel cutoff of the combustion engine being determined; the electric machine generating an accurate torque when the applied drive torque approximately corresponds to the drag torque of the combustion engine. With the aid of the verification of the correct torque of the electric machine, not only can it be determined if the operating strategy is reliably executed during vehicle operation, but also the electric machine may be tested rapidly and easily for its operability in a test at the end of the assembly line, after the manufacture of the motor vehicle.

In one example embodiment, an error is indicated in response to a difference between the drive torque applied by the electric machine during the overrun fuel cutoff of the combustion engine, and the drag torque. An information item to the driver allows him or her to be signaled to, in a timely manner, that there is a possible defect of the electric machine or of the control unit controlling the electric machine. Thus, the driver may find a garage for eliminating the defect, in order that the hybrid drive may always be operated under optimum conditions of the specific operating strategy. The indication of the component defect in a test at the end of the assembly line or in a garage also facilitates troubleshooting.

In one variant, in the event of a difference between the drive torque applied by the electric machine during the overrun fuel cutoff of the combustion engine, and the drag torque, the incorrectly determined drive torque of the electric machine is corrected using an offset change determined in accordance with the error. Consequently, the utilized control unit having the software implemented in it may be further used. This procedure is then particularly useful, when the check of the drive torque takes place during operation of the motor vehicle, which may then always be continued using a corrected, positive torque of the electric machine as a drive torque during hybrid operation.

If it is not possible to correct the incorrect torque of the electric machine, then an emergency operating mode of the motor vehicle is started in response to a difference between the drive torque applied by the electric machine during the overrun fuel cutoff of the combustion engine, and the drag torque. This emergency program may include a correction of the setpoint torque of the combustion engine, in order that a shift in load level takes effect and the combustion engine continues to be able to be operated at an optimum operating point. Alternatively, or in addition, a stop prohibition of the combustion engine may be stored, in order to prevent the motor vehicle from being rendered non-operational in the case of a defective electric machine.

In a further refinement, the injectors of the combustion engine are closed for the overrun fuel cutoff of the combustion engine. This ensures that no more combustion processes take place in the combustion engine, and that the combustion engine does not actively contribute to driving the power train of the motor vehicle. The combustion engine is merely kept at the predetermined speed by the electric machine.

During the overrun fuel cutoff of the combustion engine, the electric machine advantageously operates to set the predetermined speed in a speed control mode. In this manner, the predetermined speed is always held constant, and the torque check is carried out under comparable conditions.

In one embodiment, the predetermined speed is set by a controller of the electric machine, and the applied drive torque of the electric machine is compared to a modeled drag torque of the combustion engine. In order to conduct a highly accurate check of the calculated torque of the electric machine, the drag torque, which the combustion engine has at the time of the check, must be accurately determined, since it varies under the different operating conditions of the engine. In one variant, the modeled drag torque of the combustion engine is ascertained during a test bench operation of the combustion engine as a function of various operating parameters, in particular, the temperature, the speed and the load, and stored as a characteristics map. To compare the torque applied by the electric machine during the check, only the current operating parameters of the combustion engine must be determined in order to select the suitable drag torque for the check.

In order to rule out measuring errors, the drive torque of the electric machine is compared to the modeled drag torque at different overall speeds of the electric machine and of the combustion engine. In this context, an arithmetic mean of the individual measurements is calculated in each instance, in order to exclude a single value that is too high.

A further refinement of the present invention relates to a device for verifying a drive torque applied by an electric machine in a hybrid drive of a motor vehicle, the motor vehicle being propelled by the electric machine and/or an internal combustion engine, and it being checked if the drive torque applied by the electric machine is determined accurately in accordance with a specified driving strategy. In order to ensure that the operating strategy is correctly implemented and a shift in load level in the power train functions reliably during operation of the motor vehicle, devices are available, which evaluate the drive torque applied by the electric machine with regard to its accuracy, using a drag torque generated by the combustion engine during an overrun fuel cut off. This has the advantage that errors in the calculation of the torque of the electric machine are reliably detected.

The electric machine and the combustion engine are advantageously controlled by at least one control unit, which includes a controller for controlling the speed of the electric motor and a memory for storing the modeled drag torques of the combustion engine; the control unit calculating the drive torque of the electric machine according to the operating strategy of the motor vehicle and comparing it to the drag torque. Consequently, it is possible to check the drive torque of the electric machine without additional auxiliary devices.

In one development, the electric machine is situated on a drive shaft of the combustion engine, which is also referred to as a parallel hybrid drive train. This set-up of the combustion engine and the electric machine improves the check, since no additional transmission stage is situated between them, and the electric machine transmits a torque on the same shaft as the combustion engine.

The present invention allows a number of specific embodiments. One of these shall be explained in greater detail with reference to the figures.

DETAILED DESCRIPTION OF EXAMPLE EMBODIMENTS

Figure 1:
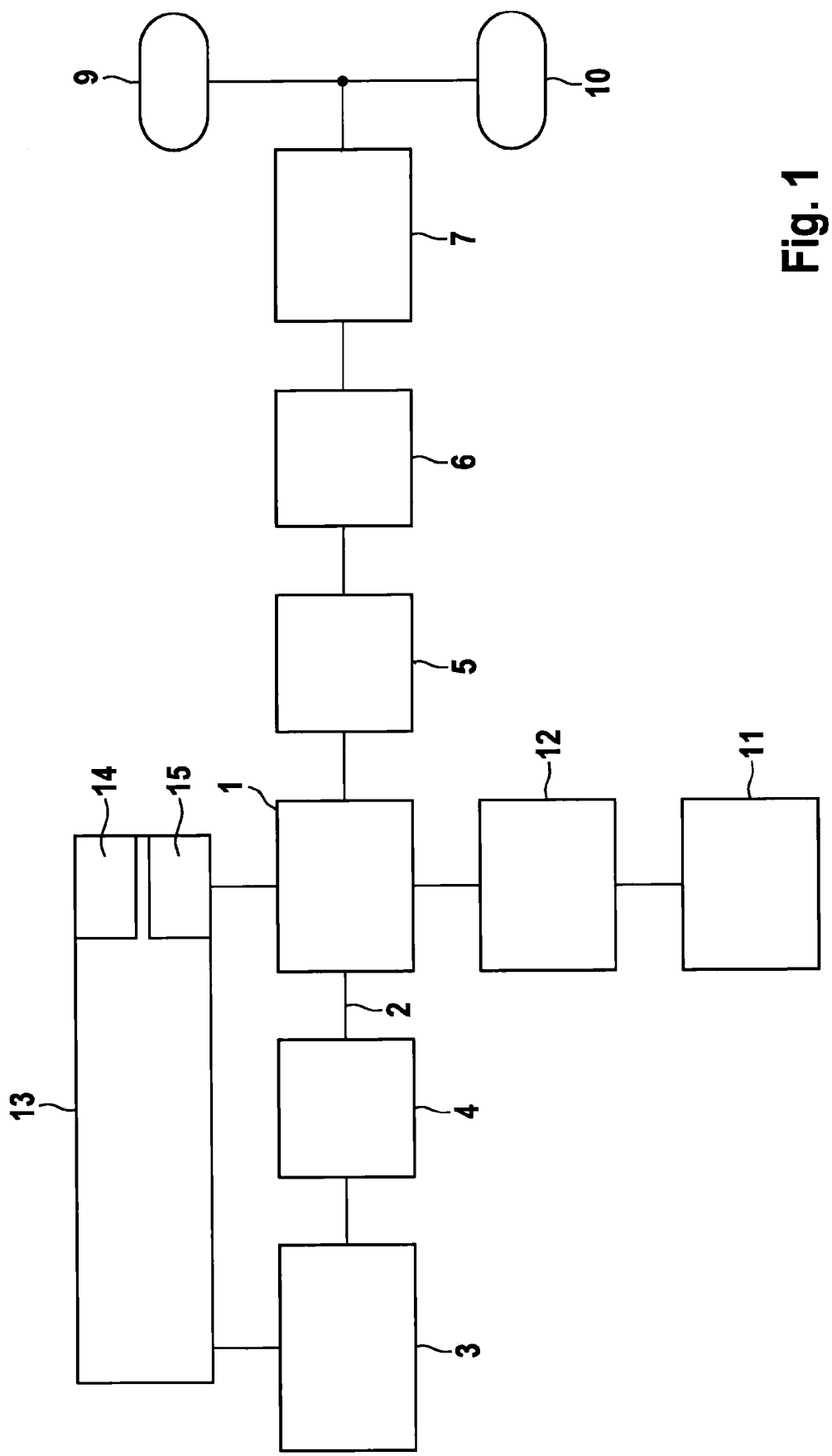
FIG. 1 shows schematic exemplary embodiment of a hybrid vehicle configured as a parallel hybrid.

FIG. 1 shows a hybrid vehicle designed as a parallel hybrid. In this development, an electric motor 1 is situated on drive shaft 2 of an internal combustion engine 3. Combustion engine 3 is connected to electric motor 1 by a separating clutch 4. Electric motor 1 leads through a starting clutch 5 to a torque converter 6, which is connected to a transmission 7. Transmission 7 leads to an axle 8, on which the wheels 9, 10 are situated that are driven by the described power train.

Electric motor 1 is powered by a high-voltage battery 11, which is connected to electric motor 1 via an inverter 12. Electric motor 1 and combustion engine 3 are controlled by an engine control unit 13. Engine control unit 13 includes a memory 14, in which drag torques of combustion engine 3 for various operating states of combustion engine 3 are stored.

There are various operating modes, in which a parallel hybrid may be operated. In a first operating mode, separating clutch 4 is open and combustion engine 3 is disconnected from the power train and automatically stopped. The hybrid vehicle is operated purely electrically by the motively-connected electric motor 1 and the energy stored in high-voltage battery 11.

If the energy contained in high-voltage battery 11 falls below a particular threshold value, combustion engine 3 is automatically started and coupled to the power train, which is accomplished by closing separating clutch 4. Combustion engine 3 now contributes to propelling the hybrid vehicle. In this second operating mode, electric motor 1 is switched over into the generative mode, in which power is now fed back into high-voltage battery 11 again. Hi-voltage battery 11 is charged.

The strategy for executing the automatic charging and discharging operations is a function of the specific operating strategy stored in engine control unit 13; the operating strategy being basically a function of high-voltage battery 11, since high-voltage battery 11 may never be discharged to a high degree. In the case of high-voltage batteries presently known, the lowest threshold value is 25%.

Figure 2:
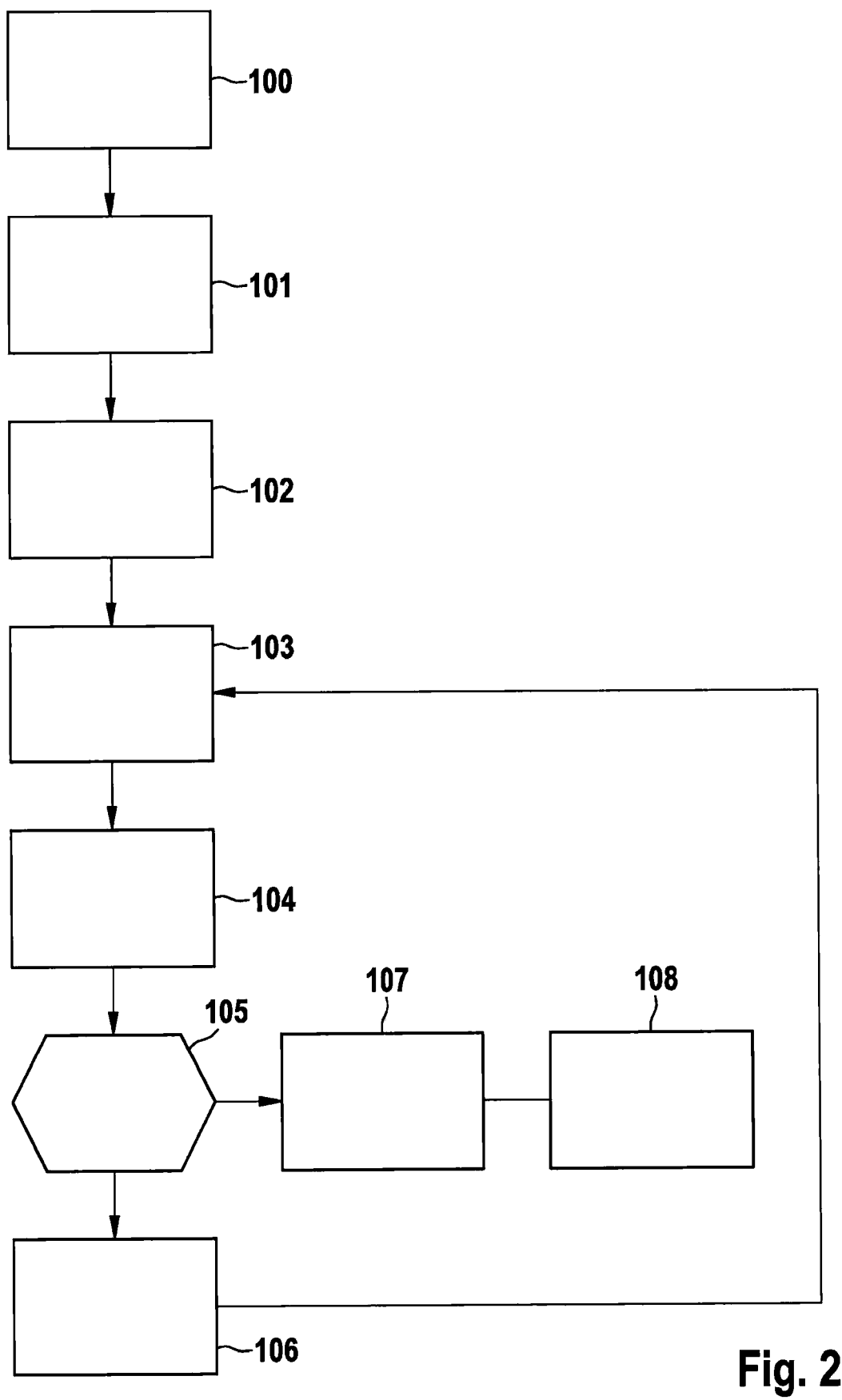
FIG. 2 shows a schematic flow chart for checking a drive torque of an electric motor.

An exemplary embodiment for the verification of the drive torque of electric motor 1 shall be explained with the aid of FIG. 2. Such a verification is either performed when an error is suspected during the operation of the motor vehicle. However, this check may also be performed in a standard manner as a check at the end of the assembly line, during the manufacture of the motor vehicle.

In block 100, the starting clutch 5 between torque converter 6 and drive shaft 2 is opened; combustion engine 3 and electric motor 1 being situated on the drive shaft. Consequently, it is ensured that the motor vehicle is stationary and no power transmission to the driven wheels is set. In block 101, the environmental conditions of the hybrid drive are checked. In so doing, the state of charge of high-voltage battery 11 is evaluated as to whether sufficient energy is available for operating electric motor 1. In addition, inter alia, the temperature of electric motor 1, inverter 12 and further components of the electric drive are checked. If the present environmental conditions do not allow the drive torque of electric motor 1 to be checked, since, for example, the energy status of the high-voltage battery is too low, then the method returns to block 100. If the environmental conditions of the hybrid drive are sufficient for a check, then the method goes over to block 102, in which idling conditions of the hybrid drive are conditioned.

The closing of separating clutch 4 between electric motor 1 and combustion engine 3 belongs to these idling conditions. In this step, combustion engine 3 is also fired during idling, which means that a fuel-air mixture is burned in combustion engine 3, thereby resulting in combustion engine 3 actively contributing to the driving of drive shaft 2. In addition, in this step, high-voltage battery 11 is set, such that the state of charge of high-voltage battery 11 is, for example, 50%. Furthermore, care is taken that the oil of combustion engine 3 is in a warm operating state, which is given, for example, at a temperature of 80° C.

If the conditioning of the hybrid drive during idling is complete, then, in block 103, an overall speed n of the power train (combustion engine 3 and electric motor 1) is raised to a selected speed of 4000 rpm. If the speed is set to 4000 rpm in a stable manner, then the actual check of the drive torque of electric motor 1 starts in block 104. In this context, combustion engine 3 is brought into the state of "overrun fuel cutoff," which means that combustion engine 3 does not individually contribute to driving drive shaft 2. Electric motor 1 is switched into the speed control mode, in order to keep overall speed n of the drive at 4000 rpm. This is carried out by the controller 15 included in control unit 13. However, as an alternative, controller 15 may also be contained in inverter 12, which includes a control unit. In this context, combustion engine 3 is externally driven in a mechanical manner by electric motor 1, so that it also co-rotates.

Control unit 13 calculates the current torque $T_{Eres}$ of electric motor 1 in this state.

The following apply to the calculation of torque $T_{Eres}$ of electric motor 1:

$$P = T_{Eres} * \Omega \text{ und } P = U * I_E$$

$$T_{Eres} * \Omega = U * I_E,$$

where the following variables indicate
$\Omega$ angular velocity of electric motor 1;
U voltage applied to electric motor 1; and
$I_E$ the current flowing through electric motor 1.
Angular velocity $\Omega$ is determined from $$\Omega = 2\pi n,$$

where n is the set, overall speed of 4000 rpm.

$$T_{Eres} = \frac{U * I_E}{\omega} = \frac{U * I_E}{2 * \pi * n}$$

The current $I_E$ flowing through electric motor 1 is measured across a resistor at electric motor 1.

In block 104, calculated, resulting torque $T_{Eres}$ is subtracted from drag torque $T_{CDrag}$ of combustion engine 3. Drag torque $T_{CDrag}$ is taken from a characteristics map, which is stored in memory 14 of control unit 13 as a function of load L, an oil temperature T and speed n. A difference $T_{delta}$ is determined from it.

$$T_{delta} = T_{CDrag} - T_{Eres}.$$

In block 105, this difference $T_{delta}$ is compared to a threshold value, which represents a tolerance range for the deviation. If difference $T_{delta}$ is less than the threshold value, then calculated torque $T_{Eres}$ of electric motor 1 is acceptable (block 106). The method subsequently returns from block 106 to block 103, where a new overall speed n of 3000 rpm is set for electric motor 1 and combustion engine 3, and blocks 104 and 105 are run through again. In the case of a positive result, blocks 104 and 105 are run through at a new speed of n=2000 rpm as a further check.

If it is determined, in block 105, that difference $T_{delta}$ is greater than the permissible threshold value, then resulting torque $T_{Eres}$ applied by electric motor 1 is not acceptable. After this error has been detected in block 107, emergency operating measures, such as a prohibition from stopping combustion engine 3, are initiated in block 108. Consequently, the motor vehicle is prevented from becoming non-operational due to the defect in electric motor 1, since the motor vehicle may still continue to travel, using combustion engine 3.

What is claimed is:

1. A method for checking a drive torque applied by an electric machine in a hybrid drive of a motor vehicle, the motor vehicle being propelled by at least one of the electric machine and an internal combustion engine, the method comprising:
   setting at least one of the electric machine and the combustion engine to a predetermined overall speed;
   closing a separating clutch situated between the electric machine and the combustion engine;
   shifting the combustion engine into a state of fuel cutoff to generate a drag torque;
   determining a drive torque applied by the electric machine during the fuel cutoff of the combustion engine; and
   checking if the drive torque applied by the electric machine is determined accurately by comparing the drive torque to the drag torque.

2. The method as recited in claim 1, wherein an error is indicated if a difference between the drive torque and the drag torque exceeds a threshold value.

3. The method as recited in claim 2, wherein if the error is indicated, the drive torque is corrected using an offset change corresponding to the error.

4. The method as recited in claim 2, wherein an emergency operating mode of the motor vehicle is started in response to the error indication.

5. The method as recited in claim 1, wherein injectors of the combustion engine are closed for the fuel cutoff of the combustion engine.

6. The method as recited in claim 1, wherein during the fuel cutoff of the combustion engine, the electric machine operates in a speed control mode for setting the predetermined overall speed.

7. The method as recited in claim 6, wherein the predetermined overall speed is set by a controller of the electric machine, and the applied drive torque of the electric machine is compared to a modeled drag torque of the combustion engine.

8. The method as recited in claim 7, wherein the modeled drag torque of the combustion engine is ascertained during a test-bench operation of the combustion engine as a function of operating parameters including a temperature, a speed, and a load, and stored as a characteristics map.

9. The method as recited in claim 7, wherein the drive torque of the electric machine is compared to the modeled drag torque of the combustion engine at different overall speeds.

10. A control unit for checking a drive torque applied by an electric machine in a hybrid drive of a motor vehicle, the motor vehicle being propelled by at least one of the electric machine and an internal combustion engine, the device comprising:
    a memory configured to store modeled drag torques of the combustion engine;
    a controller configured to:
        control a speed of the electric motor;

close a separating clutch situated between the electric machine and the internal combustion engine;

set the combustion engine in a fuel cut off state;

calculate the drive torque of the electric machine; and compare the drive torque of the electric machine to the modeled drag torque of the combustion engine.

11. The control unit as recited in claim 10, wherein the electric machine is situated on a drive shaft of the combustion engine.

* * * * *